(12) United States Patent
Vanhooydonck

(10) Patent No.: US 11,084,306 B2
(45) Date of Patent: Aug. 10, 2021

(54) METHOD OF MANUFACTURING DECORATIVE SURFACES

(71) Applicant: AGFA NV, Mortsel (BE)

(72) Inventor: Rudi Vanhooydonck, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 16/652,747

(22) PCT Filed: Oct. 1, 2018

(86) PCT No.: PCT/EP2018/076623
§ 371 (c)(1),
(2) Date: Apr. 1, 2020

(87) PCT Pub. No.: WO2019/068627
PCT Pub. Date: Apr. 11, 2019

(65) Prior Publication Data
US 2020/0230989 A1    Jul. 23, 2020

(30) Foreign Application Priority Data

Oct. 2, 2017  (EP) .................................. 17194346

(51) Int. Cl.
*B44C 5/04* (2006.01)
*B41M 5/00* (2006.01)
(Continued)

(52) U.S. Cl.
CPC ............. *B41M 5/0047* (2013.01); *B44C 5/04* (2013.01); *B32B 2260/028* (2013.01);
(Continued)

(58) Field of Classification Search
CPC .. B41M 5/0047; B44C 5/04; B32B 2260/028; B32B 2260/046; B32B 2307/554;
(Continued)

(56) References Cited

U.S. PATENT DOCUMENTS 5,903,288 A    5/1999  Yamaguchi
9,855,767 B2 *  1/2018  Strijckers ............... B41M 7/009
(Continued)

FOREIGN PATENT DOCUMENTS

EP    2865527     *  4/2015  ........ E04F 15/02038
EP    3 235 647 A1   10/2017
(Continued)

OTHER PUBLICATIONS

Official Communication issued in International Patent Application No. PCT/EP2018/076623, dated Jan. 4, 2019.
(Continued)

*Primary Examiner* — Huan H Tran
(74) *Attorney, Agent, or Firm* — Leydig, Voit & Mayer, Ltd.

(57) ABSTRACT

A method of manufacturing decorative panels includes selecting a paper with a paper weight between 50 g/m² and 130 g/m² and a porosity according to Gurley's method between 8 and 20 seconds; selecting a wood pattern; generating a selection mask representing one or more wood nerves; one or more wood pores, and/or one or more wood imperfections from the wood pattern, by image analyzing the wood pattern; and supplying the wood pattern and the selection mask to an inkjet print head unit for forming a decorative layer. The inkjet print head unit includes a plurality of nozzles and the method further includes determining a set of nozzles from the plurality of nozzles based on an inactivity of a nozzle by calculating an inactivity-duration for the nozzles and by comparing the calculated inactivity-duration to a threshold value; wherein a part of the selection mask is formed with the determined set of nozzles.

15 Claims, 2 Drawing Sheets

(51) Int. Cl.
  *B41J 2/01* (2006.01)
  *B41J 11/00* (2006.01)
  *E04F 15/02* (2006.01)

(52) U.S. Cl.
  CPC ... *B32B 2260/046* (2013.01); *B32B 2307/554* (2013.01); *B32B 2607/00* (2013.01); *B41J 2/01* (2013.01); *B41J 11/002* (2013.01); *E04F 15/02* (2013.01)

(58) Field of Classification Search
  CPC ....... B32B 2607/00; B41J 2/01; B41J 11/002; B41J 2002/16529; B41J 11/0015; B41J 2/16526; E04F 15/02; B44F 9/02
  See application file for complete search history.

(56) References Cited

U.S. PATENT DOCUMENTS

| | | | |
|---|---|---|---|
| 10,022,956 B2 * | 7/2018 | De Mondt | E04F 15/02038 |
| 10,124,603 B2 * | 11/2018 | Clement | B41M 5/52 |
| 10,464,343 B2 * | 11/2019 | Van Garsse | B41M 5/0047 |
| 2016/0347084 A1 * | 12/2016 | Clement | B44C 5/0469 |
| 2016/0347085 A1 | 12/2016 | Cloots et al. | |
| 2018/0147873 A1 * | 5/2018 | De Mondt | B32B 27/08 |
| 2018/0325558 A1 * | 11/2018 | Yacoub | A61B 17/7056 |

FOREIGN PATENT DOCUMENTS

| | | |
|---|---|---|
| JP | 2017-128113 A | 7/2017 |
| WO | 2015/104249 A1 | 7/2015 |
| WO | 2015/118451 A1 | 8/2015 |
| WO | 2016/113190 A1 | 7/2016 |

OTHER PUBLICATIONS

Bouwens, "Method of Manufacturing Decorative Panels", U.S. Appl. No. 16/652,748, filed Apr. 1, 2020.

* cited by examiner

METHOD OF MANUFACTURING DECORATIVE SURFACES

CROSS REFERENCE TO RELATED APPLICATIONS

This application is a 371 National Stage Application of PCT/EP2018/076623, filed Oct. 1, 2018. This application claims the benefit of European Application No. 17194346.7, filed Oct. 2, 2017, which is incorporated by reference herein in its entirety.

BACKGROUND OF THE INVENTION

1. Field of the Invention

The present invention to a method for manufacturing decorative panels, which comprises rendering wood pattern by inkjet technology to have a decorative surface that looks and feels as wood.

2. Description of the Related Art

Wood patterns are traditional printed by conventional printing technology such as offset or rotogravure printing in resolution above 1800 DPI (dots-per-inch) with several colored inks.

More and more, instead of analogue printing techniques, is digital printing technology tried for rendering the wood patterns by marking devices for manufacturing wood simulated decorative surfaces. The advantages of digital printing technology, such as inkjet printing are well known for short-run printing and the possibility of personalized wood simulated decorative surfaces. With laminate floor panels are wooden floor parts or parquetry imitated.

The wood pattern could be rendered in a plurality of passes for example by a marking device wherein an inkjet print head unit moves back and forth, while jetting, over a substrate to complete a rendered wood pattern for forming a decorative layer such as disclosed in WO215/104249 (AGFA GRAPHICS NV). The wood pattern may also be rendered in one pass, also called single pass, such as disclosed in WO2016/113190 (AGFA GRAPHICS) discloses a manufacturing method wherein the wood patterns are rendered in one pass. The rendering method in one pass is in detail disclosed in [0085].

In an industrial environment for the manufacturing of decorative panels, a nozzle in an inkjet print head unit may be clogged after a time of printing but also after a time of non-printing. Dust (e.g. from substrate) in the environment of the inkjet print head unit are detrimental for the operability of nozzles in the inkjet print head unit. Also, the drying of rendered wood patterns may result in emissions from the jetted droplets, which clogs the ink in the nozzles. The radiation of drying units for drying a rendered wood pattern and high temperatures in the environment of the inkjet print head unit may also result in clogging of a nozzle in the inkjet print head unit. In addition, the movement of substrate and inkjet print head unit may result in the drying out of the nozzle so ink gets clogged in the nozzle. Also mist from jetted droplets results in clogged nozzles. The industrial environment for manufacturing of decorative surfaces has also much higher temperature than room temperature (+/−20° C.), especially when one or more heat-presses are used in the manufacturing of decorative surfaces. This heat also dries the nozzle so ink gets clogged in the nozzle.

A clogged nozzle results in a wrong placing of a droplet on the substrate by a disturbed trajectory of the droplet or results a failure of jetting droplets from said clogged nozzle. When such nozzle fails or jets on a wrong place, this result in a bad rendered wood pattern with density shortage and/or a disturbance in the defective wood pattern for example a non-jetted line.

To keep nozzles not get dried out, spitting when no wood pattern is jetted, should be a solution but this put the production timing of decorative panels in danger because the time of keeping nozzles alive downsizes the production capacity due to longer production timings, which is an economic disadvantage.

WO2016/113190 (AGFA GRAPHICS NV) discloses at [0155] a spitting method by pseudo-randomly jetting droplets in the wood pattern for preventing clogging but there is still a eed for prevention nozzles to become clogged, that doesn't compromise:
colors (hue, luminance, chroma) of said wood patterns; and
production timing of rendering wood patterns and manufacturing decorative panels comprising a rendered wood pattern by inkjet technology.

SUMMARY OF THE INVENTION

In order to overcome the problems described above, preferred embodiments of the present invention have been realised with a method of manufacturing decorative panels. Said manufacturing of decorative panels or surfaces comprises a method of rendering wood patterns, further called a wood simulation method; which is suitable for forming a decorative layer. Said decorative layer becomes the decorative part of a decorative panel after impregnation; applying core layer and heat-pressing. Said decorative panel is than a simulation of real wood.

A wood simulation method for manufacturing decorative surfaces comprising the steps:
selecting a wood pattern ($W_{1\ldots M, 1\ldots N}$);
generating a selection mask ($M_{1\ldots M, 1\ldots N}$), representing one or more wood nerves; one or more wood pores and/or one or more wood imperfections from the wood pattern ($W_{1\ldots M, 1\ldots N}$), by image-analysing the wood pattern ($W_{1\ldots M, 1\ldots N}$);
supplying the wood pattern ($W_{1\ldots M, 1\ldots N}$) and selection mask ($M_{1\ldots M, 1\ldots N}$) to an inkjet print head unit; which comprises a plurality of nozzles;
determining a set of nozzles from the plurality of nozzles based on inactivity of a nozzle;
jetting droplets on a substrate by the plurality of nozzles according with the supplied wood pattern and jetting droplets on the substrate from the determined set of nozzles according with the supplied selection mask ($M_{1\ldots M, 1\ldots N}$).

In the present invention droplets are jetted by said plurality of nozzles for forming said wood pattern (=according said wood pattern). Also droplets are jetted by said determined set of nozzles for preventing clogging of said nozzles and for forming a part of said selection mask (=according said selection mask). The nozzles are triggered for firing a droplet by the pixels of said supplied wood pattern and/or said supplied selection mask. Thus according to said supplied wood pattern and/or said supplied selection mask.

The present invention does not jet droplets pseudo-randomly in the wood-pattern as is disclosed in [0155] of WO2016/113190 (AGFA GRAPHICS) but according to a selection mask which is defined by nerves of said wood pattern. It is found that jetting droplets pseudo-randomly in the wood pattern inacceptable influences the background color of the wood pattern. The heat-pressing influences namely the colors of said rendered wood pattern from said decorative layer tremendous so said pseudo-randomly jetted droplets has an impact on color changing. Jetting on a nerve from a wood pattern has no impact on the color changing after heat-pressing.

The supply of the wood pattern ($W_{1 \ldots M, 1 \ldots N}$) and selection mask ($M_{1 \ldots M, 1 \ldots N}$) may be supplying one image wherein the selection mask ($M_{1 \ldots M, 1 \ldots N}$) is incorporated in the wood pattern ($W_{1 \ldots M, 1 \ldots N}$). But separately supplying is more preferred so modification of the selection mask ($M_{1 \ldots M, 1 \ldots N}$) is still possible while rendering a number of copies. The incorporation of the selection mask ($W_{1 \ldots M, 1 \ldots N}$), whether or not modified, may be performed 'on-the-fly', which means while rendering a copy of the wood pattern ($W_{1 \ldots M, 1 \ldots N}$). The selection mask is generated by a mask generator, preferably comprised in a deco workflow system. The supply to the inkjet printhead unit is performed by a transfer unit, preferably comprised in a deco workflow system.

The advantage by jetting droplets, based on the selection mask ($M_{1 \ldots M, 1 \ldots N}$), to prevent that inactive nozzles dry out, is that the background color, also called the wood tone, remains the same; which is not the case in the spitting method disclosed in WO2016/113190 (AGFA GRAPHICS NV). The one or more wood nerves; one or more wood pores and/or one or more wood imperfections represented by said selection mask ($M_{1 \ldots M, 1 \ldots N}$), if printed on top of wood nerves, wood pores and/or wood imperfections from the wood pattern, becomes after rendering slightly darker by luminance change or changes after rendering slightly in chroma or hue but it is found that this is not noticeable in a manufactured decorative surface, such as laminate, because the background color of the wood pattern ($W_{1 \ldots M, 1 \ldots N}$) remains still the same after heat pressing. The present invention gives also the small advantage to have slightly differences between copies of the same rendered wood pattern ($W_{1 \ldots M, 1 \ldots N}$), which minimized patterning in an assembled floor of decorative surfaces, manufactured as in the present invention.

The selection mask ($M_{1 \ldots M, 1 \ldots N}$) may be a binary image but also a color image. The selection mask ($M_{1 \ldots M, 1 \ldots N}$) has preferably the same size as the wood pattern ($W_{1 \ldots M, 1 \ldots N}$). It may also be smaller by only containing one or more wood pores and/or one or more wood imperfections that may be positioned while rendering together with the rendering of the wood pattern. The positioning depends on the determined set of nozzles. For clarity the one or more wood nerves; one or more wood pores and/or one or more wood imperfections represented by the selection mask ($M_{1 \ldots M, 1 \ldots N}$) shouldn't be positioned as in the wood pattern ($W_{1 \ldots M, 1 \ldots N}$) itself, they may be cloned from the wood pattern ($W_{1 \ldots M, 1 \ldots N}$) to the same position and/or another position in the selection mask, while generating the selection mask (cfr. clone stamp tool in Adobe™'s Photoshop™ 6.0). The wood nerves, wood pores and wood imperfections could be seen as a thumbprint that characterizes the wood pattern. Adding parts of this thumbprint at another position in a rendered wood pattern ($W_{1 \ldots M, 1 \ldots N}$) to prevent the clogging of a nozzle, shall not disturbing the wood pattern after rendering because the characteristic thumbprint of the wood pattern remains similar.

The determination of a set of nozzles is based on inactivity of a nozzle. If a certain nozzle is inactive for a certain time ($T_1$), it may be added to the set of nozzles, also surrounding nozzles may be added to the set of nozzles, even they were active in that certain time ($T_1$) to render the cloned one or more wood nerves; one or more wood pores and/or one or more wood imperfections.

While rendering wood patterns, especially wood patterns with a lighter background color, such as wood simulations of oak, Canadian maple, by inkjet technology, a plurality of nozzles have a long inactivity whereby the chance of drying out is large. The typical space between elongated nerves have in most wood patterns a lighter intensity than the wood nerves whereby less droplets are needed for rendering this typical space, also mostly elongated, between de wood nerves, thus more inactivity of nozzles is noticed in the rendering of this typical space.

The present invention shortens the inactivity of a nozzle to prevent that the nozzle is clogged and/or dried out. This enhances the reliability of the manufacturing of decorative surfaces comprising a wood pattern. The time of inactivity may be calculated out the wood pattern whereby each pixel is assigned to one or more nozzles of the inkjet print head unit. The non-assigned nozzles are nozzles with a larger inactivity, which may be determined by the present invention. In a preferred embodiment the determining step comprises:

calculating an inactivity-duration for a nozzle from the plurality of nozzles and comparing the calculated inactivity-duration to a threshold value ($T_1$).

An inactivity counter of each nozzle from the plurality of nozzles may be read and stored in a deco workflow system and more preferably in the inkjet print head unit. From this inactivity counter the inactivity-duration may be calculated.

By jetting these extra droplets while rendering the wood pattern for preventing the clogging, the full area of the substrate can be used for manufacturing decorative surfaces, such as laminate. Also, by jetting these extra droplets while rendering the wood pattern for preventing the clogging, makes that manufacturing of the decorative surface is not disturbed by stopping the process for cleaning nozzles from the inkjet print head unit. The advantage is that these extra droplets becomes not noticeable in manufactured decorative surfaces, which comprises the wood pattern rendered as the present invention.

The threshold value ($T_1$) depends mainly on the ink-set that is used for rendering the wood-patterns but also to the amount of dust-particles in the environment of the inkjet print head unit. In a preferred embodiment the present invention comprising an additional step:

measuring the humidity in a first time ($H_{t1}$) and in a second time ($H_{t2}$) at the inkjet print head unit and enlarging the threshold value $T_1$ when the humidity rises ($H_{t2}-H_{t1}>0$) between the first and second time. The threshold value T1 is reduced when the humidity drops.

The detection of the one or more wood nerves; one or more wood pores and/or one or more wood imperfections in a wood pattern for generating the selection mask ($M_{1 \ldots M, 1 \ldots N}$) is performed by the image-analysing step. This step preferably comprises fast Fourier transformation (FFT), histogram calculation and/or image filtering method. Useful image filtering methods are preferably selected from a group comprising two dimensional Gaussian filtering; two dimensional median filtering; use of two dimensional convolution matrix; adaptive histogram equalization; two dimensional frequency response and two dimensional correlation. More information of such image filtering methods is disclosed at (https://nl.mathworks.com/help/images/linear-filtering.html) and could be found in standard works about image processing.

In a preferred embodiment the image analysis additional comprises:
calculating a luminance (L) in a pixel from the wood pattern ($W_{1...M, 1...N}$) and comparing the calculated luminance (L) to an other threshold value ($T_2$), more preferably
calculating a maximum luminance ($L_{max}$) and a minimum luminance ($L_{min}$) from the wood pattern (W); and
wherein the other threshold value ($T_2$) is smaller than the minimum luminance added by 10 percent, preferably 5 percent, more preferably 2 percent from difference between the maximum luminance ($L_{max}$) and the minimum luminance ($L_{min}$).

Depending on the luminance of the pixels in the wood pattern, the one or more wood nerves; one or more wood pores and/or one or more wood imperfections is detected and determined and even more selected if these pixels are nearby the minimum luminance ($L_{min}$) which means the darker pixels of the one or more wood nerves; one or more wood pores and/or one or more wood imperfections are determined. It is found that (extra) droplets to prevent the clogging in nozzles on these darker areas is not noticeable in a manufactured decorative surface, such as laminate. Probably due to the hue and chroma change after the heat pressing step in the manufacturing of the decorative surface.

The volume of each droplet from the jetted droplets, according with the selection mask ($M_{1...M, 1...N}$), is at least a quart, most preferably at least a tenth, smaller than volume of each droplet from the jetted droplets, according with the wood pattern ($W_{1...M, 1...N}$).

By controlling the inkjet print heads in the inkjet print head unit the volume of a droplet out a nozzle may be adapted for example by waveforms. Waveforms are typically used in piezoelectric inkjet printheads. A piezoelectric inkjet printhead comprises a plurality of ink channels in parallel. Each ink channel is provided with a piezo-actuator, which on application of a voltage pulse generates pressure oscillations inside the ink channel. These pressure oscillations may push a droplet of ink out of the nozzle, which is connected to one of the plurality of ink channels. The voltage pulse is called a waveform.

A droplet for the prevention of clogging preferably has a lower volume, preferably half less, than the maximum volume of a droplet for rendering the wood pattern.

In a preferred embodiment, no droplet on the substrate is generated for a part or all of the determined nozzles by adapting the waveform for the part or all of the determined nozzles so the actuation pulse, defined by the adapted waveform, does not generate a droplet in the nozzle but the actuation pulse ensures the wetting of the nozzle to prevent the drying out. It is found that still very tiny droplets, which looks like mist, are generated so the generation of the selection mask from the present invention is still needed. The present invention comprises thus also the following embodiment:

A wood simulation method for manufacturing decorative surfaces comprising the steps:
selecting a wood pattern ($W_{1...M, 1...N}$);
generating a selection mask ($M_{1...M, 1...N}$), representing one or more wood nerves; one or more wood pores and/or one or more wood imperfections from the wood pattern ($W_{1...M, 1...N}$), by image-analysing the wood pattern ($W_{1...M, 1...N}$);
supplying the wood pattern ($W_{1...M, 1...N}$) and selection mask ($M_{1...M, 1...N}$) to an inkjet print head unit; which comprises a plurality of nozzles;
determining a set of nozzles from the plurality of nozzles based on inactivity of a nozzle;
jetting droplets on a substrate by the plurality of nozzles according with the wood pattern using a waveform and actuating the determined set of nozzles according with the selection mask ($M_{1...M, 1...N}$), using an other waveform. Preferably, using the other waveform generates a small droplet that is smaller than 4 pL or more preferably a small cloud of mist ink particles; which comprises a plurality of ink particles smaller than 0.5 pL but with a total volume smaller than 4 pL or most preferably does not generate a droplet but wherein the other waveform keeps the nozzle wet.

The inkjet printhead unit is preferably part of a manufacturing line for manufacturing decorative surfaces, such as laminates, which comprises a rendered wood pattern by inkjet technology.

If the inkjet printhead unit is movable than droplets from the determined nozzles may be jetted outside the rendered wood pattern, But this is less preferred because the moving of the inkjet printhead unit outside the rendered wood pattern delays the production time of rendering wood patterns.

DETAILED DESCRIPTION OF THE PREFERRED EMBODIMENTS

Figure 1:
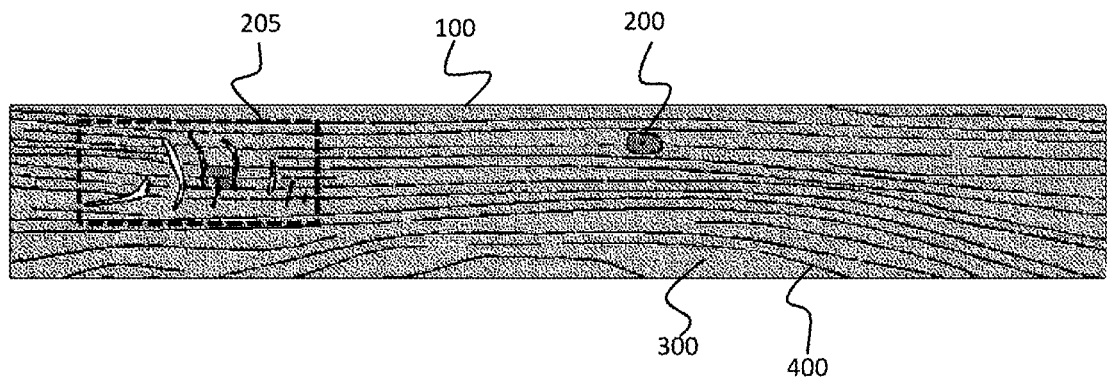
FIG. 1 (FIG. 1) discloses a wood pattern (100) comprising a plurality of dark lines, called wood nerves (400). The background color (300) of a wood pattern (100) is determined by the color from the spaces between the wood nerves. The wood pattern (100) comprises a knot (200) and some other wood imperfections (205).
Figure 2:
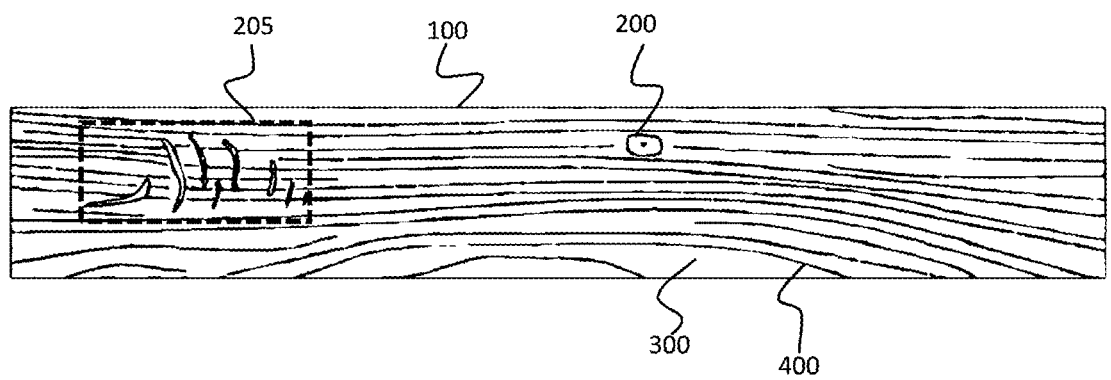
FIG. 2 (FIG. 2) discloses a wood pattern (100) comprising a plurality of dark lines, called wood nerves (400). The background color (300) of a wood pattern (100) is determined by the color from the spaces between the wood nerves. The background color (300) is lighter than in FIG. 1 (FIG. 1). The wood pattern (100) comprises a knot (200) and some other wood imperfections (205).
Figure 3:
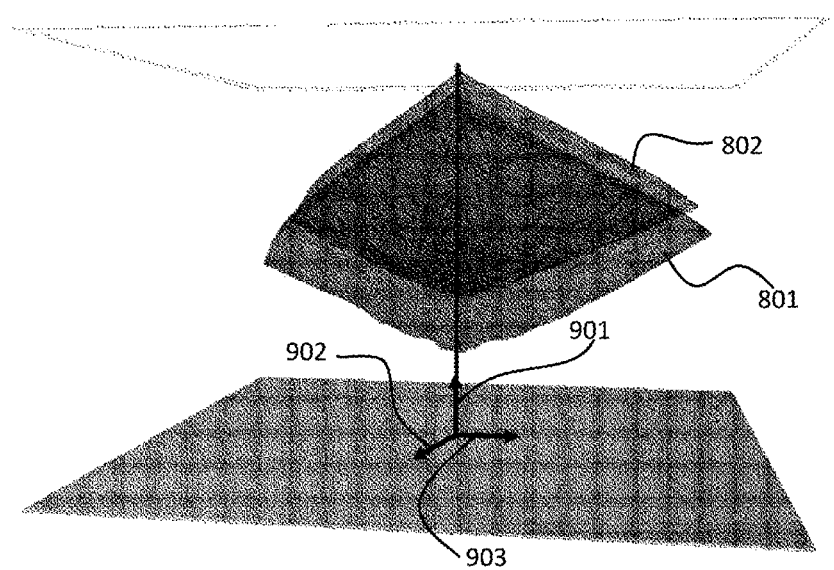
FIG. 3 (FIG. 3) discloses a first color gamut (801) and a second color gamut (802) wherein the first gamut is determined after heat-pressing according to a disclosed manufacturing method of decorative surfaces, namely wherein the substrate is paper, sucked in a thermosetting resin and heat pressed on HDF and the second gamut is determined before heat-pressing. This shows the tremendous colour gamut change after heat pressing. Both color gamuts (801, 802) are shown in CIELAB color space wherein a first axes (901) is for determining the L-value, also called luminance value, a second axes (903) for determining the a-value and a third axes (904) to determining the b-value. More information about CIELAB is disclosed on https://en.wikipedia.org/wiki/Lab_color_space#CIELAB FIG. 4 (FIG. 4) discloses the first color gamut and the second color gamut as in FIG. 3 (FIG. 3) but displayed in xy chromaticity coordinates.
Figure 4:
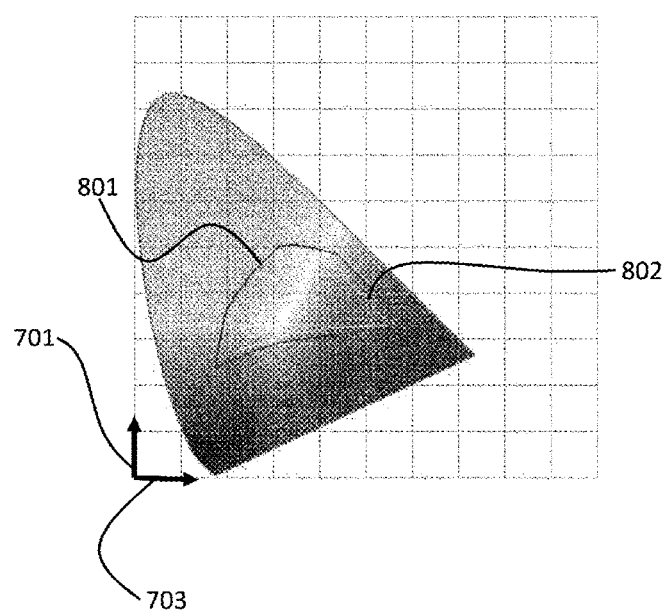

The substrate may be a paper and the other substrate a wood-based layer for decorative laminates, as decorative surfaces, wherein the manufacturing comprises an additional step before and/or after rendering:

impregnating the paper by a thermosetting resin.

Thermosetting resin is preferably selected from the group consisting of melamine-formaldehyde based resins, ureum-formaldehyde based resins and phenol-formaldehyde based resins.

The substrate may comprise an inkjet-receiving layer, which preferably contains an inorganic pigment P and a polymeric binder B; and more preferably, wherein the pigment P is selected from the group consisting of alumina hydrates, aluminum oxides, aluminum hydroxides, aluminum silicates, and silicas. The wood pattern is than rendered on the inkjet-receiving layer. This inkjet-receiving layer is to prevent that the color strength of the wood pattern is not reduced due to the absorbing of the jetted inks in the substrate. The inkjet-receiving layer may results in extra dust nearby the print heads so the present invention is needed even more.

The substrate is preferably supported by a print table, more preferable a vacuum table wherein the substrate is held down against the support by vacuum pressure. The substrate is preferably supported by a conveyor belt, more preferably a vacuum belt wherein the substrate is held down against the support by vacuum pressure.

The jetted N transferred halftoned sub-images may be dried by a dry unit comprising an UV source (ultra violet source) or an IR source (infra red source) or by absorption in the susbtrate. The IR source is preferably a NIR source (= Near Infra Red source) such as a NIR lamp.

Wood Image

A wood image is an image, mainly a color image, representing wood and is achieved by suitable commercially available hardware, such as scanning a photograph or a wood piece or taking an image of a wood piece by a digital camera, and commercially available software, such as Adobe Photoshop™ to manipulate, such as color conversion by color management system (CMS), and to create wood images.

A wood image may be stored and/or loaded as one or more files on a memory of a computer. The embodiment may comprise a method to load a wood image into a memory of a computer.

A wood image, and also a wood pattern, are images, has typical characteristics wherein wood grain lines are elongated in a dominant direction, called the nerve direction and between these wood grain lines the tone of the wood image, also called the background color of the wood image, is determined. The elongated wood grain lines are lines, mainly dark lines, repeated with variances in frequency on top of the background color. This repeatability of these lines and spaces between these lines and color between these lines, even with variances, makes it hard to render wood patterns.

Wood Patterns

The wood pattern ($W_{1...M, 1...N}$) is a region-of-interest from a wood image so variances in wood patterns may be achieved by selecting different region-of-interests in the wood image. The variances of such wood patterns have a similar background color. The ratio of the area of such a region-of-interest as wood pattern and the area of the wood image is preferably between 50% and 100%, more preferably between 10% and 100% and most preferably between 1% and 100%. The area with the content of the region-of-interest as wood pattern is also called content area. The size of the region-of-interest and thus the wood pattern may have a width between 50 mm and 4000 mm, and a length between 100 mm and 6000 mm or more.

In the present invention, the wood pattern has preferably M color channels, one for each ink from the M inks. The rendering method may comprise an additional step wherein the wood pattern is converted from a certain colorant space (RGB, $CMYK_{offset}$) to another colorant space; which is defined by the M inks; so the converted wood pattern comprises M color channels one for each ink from the M inks or wherein the wood pattern is converted from a certain color space (CIELab, CIEXYZ) to another colorant space; which is defined by the M inks; so the converted wood pattern comprises M color channels one for each ink from the M inks. These conversion methods may be done in a color management system (CMS), comprised in a deco workflow system.

The tone in a wood pattern, also called background color of a wood pattern or wood color of a wood pattern, may be calculated by determining the color in a color histogram of the wood pattern, namely the color that dominates the most in the color histogram.

The contrast color of a wood pattern is a color in the wood pattern which has the highest color difference with the background color such as the highest delta E in CIELab. The colors in wood grain lines, wood pores and/or wood imperfections are in most wood patterns determined nearby the contrast color.

The wood grain lines are also called wood nerves. A higher frequency, sometimes called density, of wood grain lines may be caused by smaller growth rings in the wood that the wood image represents. The wood pattern may also comprise wood pores and/or wood imperfections such as knots and cracks.

The wood pattern may be divided in a sequence of bands and rendered in the sequence of bands to render the 'full' wood pattern. Each band of the sequence of bands comprises than a part of the wood pattern thus, each band is a wood pattern.

Deco Workflow System

To manage the rendering of wood patterns by one or more digital render devices in a method of manufacturing decorative surfaces, the embodiment may be performed by a deco workflow system, which for example carries out determining wood patterns, color converting of wood patterns, imposing or nesting a plurality of wood patterns on the substrate and/or digital cutting decorative surfaces comprising the rendered wood pattern. Said digital render devices is preferably an inkjet printer for multi pass inkjet printing more preferably for single pass inkjet printing.

Rendering is a stage comprising the step of halftoning an image and transferring the halftoned image to a marking device and marking the transferred halftoned image by the marking device. Halftoning, sometimes called screening is converting a continuous-tone bitmap into a halftone (pattern of dots). The deco workflow system comprises a halftoning unit for halftoning, preferably comprises a RIP (raster image processor) for rasterizing vector graphics, such as marks as explained above, in graphic files comprising the wood pattern and more preferably comprises additionally a color management system for converting wood images or wood patterns to the colors of the inks from the marking device.

The deco workflow system operates a program. Part or whole of the deco workflow system and/or the functional units or blocks thereof may be implemented in one or more circuits or circuitry, such as an integrated circuit(s) or as an LSI (large scale integration). Each functional unit or block of the deco workflow system may be individually made into an integrated circuit chip. Alternatively, part or whole of the functional units or blocks may be integrated and made into an integrated circuit chip.

A program, which is operated in the deco workflow system according to various preferred embodiments of the present invention, is a program controlling a processor in order to realize functions of the various preferred embodiments according to the present invention. Therefore, information which is handled by the deco workflow system is temporarily accumulated in a RAM at the time of the processing. Thereafter, the information may be stored in various types of circuitry in the form of ROMs and HDDs, and read out by circuitry within, or included in combination with, the deco workflow system as necessary, and modification or write-in is performed thereto. As a recording medium storing the program, any one of a semiconductor medium (for example, the ROM, a non-volatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer, which is connected through a network such as the Internet. In this case, a storage device of the server computer is also included in the present invention. In addition, a portion of a terminal device, a wireless base station, a host system, or other devices, or the whole thereof may be realized as an LSI, which is typically an integrated circuit. Each functional unit or block of the deco workflow system may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

Decorative Laminates

A decorative laminate, also called decorative panel, is preferably selected from the group consisting of kitchen panels, flooring panels, furniture panels, ceiling panels and wall panels.

Decorative laminates are constructed together for a large planar surface such as floor or wall, or for cupboards or sideboards, which comprises one or more large planar surfaces.

Manufacturing Decorative Laminates

In a preferred embodiment a method of manufacturing decorative panels comprises the wood simulation method of the present invention and additional comprises a step of heat pressing the rendered wood pattern on the substrate and an other substrate more preferably wherein the substrate is a paper and the other substrate is a core layer, preferably a wood-based layer; and comprising an additional step, after or most preferably before rendering, impregnating the paper by a thermosetting resin.

The thermosetting resin is preferably selected from the group consisting of melamine-formaldehyde based resins, ureum-formaldehyde based resins and phenol-formaldehyde based resins; and the inkjet receiving layer preferably contains an inorganic pigment P and a polymeric binder B; and wherein the pigment P is selected from the group consisting of alumina hydrates, aluminum oxides, aluminum hydroxides, aluminum silicates, and silicas.

In a preferred embodiment of the method for manufacturing decorative panels, a resin impregnated decorative layer; which comprises the rendered wood pattern $W_{(1 \ldots M, 1 \ldots N)}$ is heat pressed between a core layer, preferably a wood-based layer and cut into a decorative laminate selected from the group consisting of flooring, kitchen, furniture and wall panels.

In a preferred embodiment of the method for manufacturing decorative laminates, the decorative laminate includes a tongue and a groove capable of achieving a glue less mechanical join between decorative laminates.

Preferably the inkjet printing method of the invention is part of a DPL process, wherein the decorative layer is taken up in a stack to be pressed with the core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the rendered wood pattern $(W_{1 \ldots M, 1 \ldots N})$, wherein the thermosetting resin may be a colored thermosetting resin to reduce the amount of inkjet ink to be printed. The preferred ink set is a pigmented aqueous inkjet ink set and not a pigmented free radical UV curable ink set because these are not very well compatible with the usage of thermosetting resin in this method.

The method of manufacturing a decorative surface preferably includes: providing a relief in at least the protective layer, more preferably by means of a short cycle embossing press. The embossing preferably takes place at the same time that the core layer, the decorative layer and the protective layer, and preferably one or more balancing layers, are heat-pressed together. The relief in the protective layer preferably corresponds to the rendered wood pattern $(W_{1 \ldots M, 1 \ldots N})$.

A decorative laminate, may have a tongue and groove join and includes preferably at least a core layer, a decorative layer, comprising the rendered wood pattern $(W_{1 \ldots M, 1 \ldots N})$, and a protective layer. In order to protect the colour image of the decorative layer against wear, a protective layer is applied on top of the decorative layer. A balancing layer may also be applied at the opposite side of the core layer to restrict or prevent possible bending of the decorative laminate. The assembly into a decorative laminate of the balancing layer, the core layer, the decorative layer and the protective layer is preferably performed in the same press treatment of preferably a DPL process (Direct Pressure Laminate).

In a preferred embodiment of decorative laminates, tongue and groove profiles are milled into the side of individual decorative laminates, which allow them to be slid into one another. The tongue and grove join ensures, in the case of flooring panels, a sturdy floor construction and protects the floor, preventing dampness from penetrating.

The top surface of the decorative laminate is preferably provided with a relief matching the rendered wood pattern ($W_{1...M, 1...N}$), such as for example to accentuate the wood grain, cracks and nuts in the wood pattern ($W_{1...M, 1...N}$).

*) Core Layers for Decorative Panels

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN).

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood.

The thickness of the core layer is preferably between 2 and 12 mm, more preferably between 5 and 10 mm.

*) Paper Substrates for Decorative Laminates

The decorative layer and preferably also the protective layer and the optional balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer, which can cause undesired colour effects on the rendered wood pattern ($W_{1...M, 1...N}$).

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to rendered wood pattern ($W_{1...M, 1...N}$). For example, a light brown or grey paper may be used for rendering a wood pattern ($W_{1...M, 1...N}$) order to reduce the amount of inkjet ink needed.

If the protective layer includes a paper, then a paper is used which becomes transparent or translucent after resin impregnation so that the rendered wood pattern ($W_{1...M, 1...N}$) in the decorative layer can be viewed.

*) Ink Receiving Layer for Decorative Laminates

One or more ink receiving layers may be present on the paper substrate of the decorative layer for enhancing the image quality.

The ink receiving layer(s) may be a purely polymer based ink receiving layer, but preferably contain an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 2.0 g/m$^2$ and 10.0 g/m$^2$, more preferably between 3.0 and 6.0 g/m2.

In a particularly preferred embodiment, the ink receiving layer(s) include a polymeric binder, preferably a water soluble polymeric binder (>1 g/L water at 25° C.), which has a hydroxyl group as a hydrophilic structural unit, e.g. a polyvinyl alcohol.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less.

The ink receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink receiving layer(s) may consist of a single layer or of two, three or more layers even having a different composition. The ink receiving layer(s) may be coated onto the support side of the substrate by any conventional coating technique, such as dip coating, knife coating, extrusion coating, spin coating, slide hopper coating and curtain coating. Alternatively, the ink receiving layer(s) can also be applied by a printing technique, such as flexographic printing, screen printing and inkjet printing technology such as valvejet printheads.

Said ink receiving layer(s) influences the color of the decorative layer when the decorative panel is formed in the heat press room.

*) Thermosetting Resins for Decorative Laminates

The thermosetting resin is preferably selected from the group consisting of melamine-formaldehyde based resins, ureum-formaldehyde based resins and phenol-formaldehyde based resins.

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin that at least the paper core is satisfied with the resin. Such satisfaction can be reached when an amount of resin is provided that corresponds to at least 1.5 or at least 2 times the paper weight.

Preferably the resin provided on said paper is in a so-called B-stage. Such B-stage exists when the thermosetting resin is not completely cross linked.

Preferably the resin provided on said paper has a relative humidity lower than 15%, and still better of 10% by weight or lower.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS).

Said resin influences the color of the decorative layer at the forming of the decorative pane (=impregnation and heat-pressing).

*) Decorative Layer for Decorative Laminates

The decorative layer includes a thermosetting resin impregnated paper and a rendered wood pattern ($W_{1...M, 1...N}$) by inkjet technology. In the assembled decorative laminate, the rendered wood pattern ($W_{1...M, 1...N}$) is located on the paper on the opposite side than the side facing the core layer. The paper may be impregnated with thermosetting resin after the rendering of the wood pattern ($W_{1...M, 1...N}$) or may be impregnated with thermosetting resin before rendering of the wood pattern ($W_{1...M, 1...N}$).

A decorative laminate, like a floor panel, preferably has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

The rendered wood pattern ($W_{1...M, 1...N}$) is obtained by jetting and drying one or more aqueous inkjet inks of an aqueous inkjet ink set upon the one or more ink receiving layers.

*) Protective Layer for Decorative Laminates

A protective layer is applied above the rendered wood patter ($W_{1...M, 1...N}$), e.g. by way of an overlay, i.e. a resin provided carrier, or a liquid coating, preferably while the decor layer is laying on the core layer, either loosely or already connected or adhered thereto.

In a preferred embodiment, the carrier of the overlay is a paper impregnated by a thermosetting resin that becomes transparent or translucent after heat pressing in a DPL process. A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish. In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

*) Balancing Layer for Decorative Laminates

The main purpose of the balancing layer(s) is to compensate tensile forces by layers on the opposite side of the core layer, so that an essentially flat decorative laminate is obtained. Such a balancing layer is preferably a thermosetting resin layer, which can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative laminate a more appealing look by masking surface irregularities. Additionally, it may contain text or graphical information such as a company logo or text information.

M Inks ($I_{1...M}$)

The plurality of inks from the present invention ($I_{1...M}$) which are jettable by said inkjet printhead unit are composed into an inkjet ink set having differently coloured inkjet inks. The inkjet ink set may be a standard CMYK ink set, but is preferably a CRYK inkjet ink set wherein the magenta (M) ink is replaced by red (R) inkjet ink. The use of a red inkjet ink enhances the colour gamut for wood patterns. A wood pattern has mainly a brown background color. The use of a red (R) inkjet ink is there for more preferred than magenta inkjet ink to save more ink.

The inkjet ink set may be extended with extra inks such as brown (BR), magenta (M), red (R), green (GR), blue (BL), and/or orange (OR) to further enlarge the colour gamut of the ink set. The inkjet ink set may also be extended by the combination of the full density inkjet inks with light density inkjet inks. The combination of such dark and light colour inks and/or black and grey inks improves the image quality by a lowered graininess. However preferably the inkjet ink set consists of no more than 3 or 4 inkjet inks, allowing the design of the plurality of inkjet print head units ($U_{1...N}$) at acceptable cost.

The inkjet ink set is preferably a set of pigmented aqueous inkjet inks.

Pigmented Aqueous Inkjet Ink Sets

A pigmented aqueous inkjet ink set according to a preferred embodiment of the invention comprises:
a) a cyan aqueous inkjet ink containing a copper phthalocyanine pigment, preferably a β-copper phthalocyanine pigment;

b) a red aqueous inkjet ink containing a red pigment selected from the group consisting of C.I. Pigment Red 254, C.I. Pigment Red 122, C.I. Pigment Red 176 and mixed crystals thereof;
c) a yellow aqueous inkjet ink containing a pigment C.I Pigment Yellow 150 or a mixed crystal thereof; and
d) a black aqueous inkjet ink containing a carbon black pigment; wherein the aqueous inkjet inks contain a surfactant.

In addition to specific colour pigments, the inkjet inks contain also a surfactant, preferably a fluorosurfactant. The surfactant allows for spreading on the décor paper, which enhances indirectly also the metamerism. In a preferred embodiment of the pigmented aqueous inkjet ink set, the pigmented aqueous inkjet inks have a static surface tension at 25° C. between 19.0 mN·m and 27.0 mN·m for good spreading on the décor paper.

The hue angle H* of a red inkjet ink is normally in the range of 15° to 65°. For providing good reproduction of wood colour images, the hue angle H* of a red inkjet ink in the present invention is preferably between 15° and 50°, more preferably between 20° and 40°. In a preferred embodiment of the pigmented aqueous inkjet ink set, the red pigment is C.I. Pigment Red 254 or a mixed crystal thereof. The hue angle H* is calculated in CIELab color space by the formular: $\tan^{-1}(b^*/a^*)$ (degree) wherein a* and b* are the chromaticity coordinates in the CIE Lab color space.

The hue angle of a yellow inkjet ink is usually in the range of 75° to 110°. For providing good reproduction of wood colour images, the hue angle H* of a yellow inkjet ink in the present invention is preferably between 80° and 105°, more preferably between 85° and 95°. In a preferred embodiment of the pigmented aqueous inkjet ink set, the hue angle H* of the yellow aqueous inkjet ink is higher than 85°, more preferably between 86° and 98°, and most preferably between 87° and 95°.

The pigmented aqueous inkjet inks in the ink set should preferably also have a chroma C* of at least more than 50.

A pigmented aqueous ink may comprise a biocide a,d/or at least one pH adjuster, such as NaOH, KOH, $NEt_3$, $NH_3$, HCl. Preferred pH adjusters are triethanol amine, NaOH and $H_2SO_4$.

*) Preparation of Pigmented Aqueous Inks

The one or more aqueous inkjet inks may be prepared by precipitating or milling the colour pigment in the dispersion medium in the presence of the polymeric dispersant, or simply by mixing a self-dispersible colour pigment in the ink. Mixing apparatuses may include a pressure kneader, an open kneader, a planetary mixer, a dissolver, and a Dalton Universal Mixer. Suitable milling and dispersion apparatuses are a ball mill, a pearl mill, a colloid mill.

If the inkjet ink contains more than one pigment, the colour ink may be prepared using separate dispersions for each pigment, or alternatively several pigments may be mixed and co-milled in preparing the dispersion. The dispersion process can be carried out in a continuous, batch or semi-batch mode. The milling time can vary widely and depends upon the pigment, selected mechanical means and residence conditions, the initial and desired final particle size, etc. In the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like.

*) Polymer Latex Binders

One or more of the aqueous inkjet inks may contain a polymer latex binder, preferably a polyurethane based latex. It was observed that polyurethane based latex are less detrimental for adhesion in flooring laminates than acrylic latex binders.

The polymer latex binder is not particularly limited as long as it has stable dispersibility in the ink composition. There is no limitation on the main chain skeleton of the water-insoluble polymer.

In the preferred embodiment, the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin; when used in the manufacturing of decorative surfaces.

The latex binder polymer particles preferably have a glass transition temperature (Tg) of 30° C. or more. The minimum film-forming temperature (MFT) of the polymer latex is preferably −25 to 150° C., and more preferably 35 to 130° C.

*) Jetting Viscosity and Jetting Temperature

The jetting viscosity is measured by measuring the viscosity of the liquid at the jetting temperature. The jetting viscosity may be measured with various types of viscometers such as a Brookfield DV-II+ viscometer at jetting temperature and at 12 rotations per minute (RPM) using a CPE 40 spindle which corresponds to a shear rate of 90 s−1 or with the HAAKE Rotovisco 1 Rheometer with sensor C60/1 Ti at a shear rate of 1000 $s^{-1}$.

In a preferred embodiment, the jetting viscosity is from 10 mPa·s to 200 mPa·s more preferably from 25 mPa·s to 100 mPa·s and most preferably from 30 mPa·s to 70 mPa·s.

The jetting temperature may be measured with various types of thermometers. The jetting temperature of jetted liquid is measured at the exit of a nozzle in the printhead while jetting or it may be measured by measuring the temperature of the liquid in the liquid channels or nozzle while jetting through the nozzle. In a preferred embodiment, the jetting temperature is from 10° C. to 100° C. more preferably from 20° C. to 60° C. and most preferably from 30° C. to 50° C.

Inkjet Print Head Unit

An inkjet print head unit is a unit, which comprises a plurality of inkjet printheads. A printhead is a means for jetting a liquid on a substrate through a nozzle. The nozzle may be comprised in a nozzle plate, which is attached to the printhead. A plurality of nozzles in a printhead forms one or more nozzle rows. The inkjet print head unit in the present invention is attached to a marking device to mark by inkjet technology a wood pattern ($W_{1\ldots M, 1\ldots N}$) on a substrate. The marking device is preferably capable of marking substrate with a width between 1 meter and 5 meter and if the substrate is not a web but a sheet, the marking device is preferably capable of marking substrates with a height between 1 meter and 10 meter. More information about inkjet technology, incorporate printheads into an inkjet print head unit and marking devices, which uses inkjet technology, are disclosed in STEPHEN F. POND. Inkjet Technology and Product Development Strategies. USA: Torrey Pines Research, 2000.

The inkjet print head unit is capable of or comprises one or more nozzle rows for each ink of M inks (11_0.

A printhead preferably has a plurality of nozzles and one or more nozzle rows, which may be comprised in a nozzle plate. A set of liquid channels, comprised in the printhead, corresponds to a nozzle of the printhead, which means that the liquid in the set of liquid channels can leave the corresponding nozzle in the rendering method. The liquid is preferably an ink, more preferably an aqueous inkjet ink. The liquid used to jet by a printhead is also called a jettable liquid or inkjet ink. A high viscosity jetting method with water based inkjet ink is called a high viscosity water base jetting method.

Typically the jetting viscosity of the state of the art for jettable liquids is from 3 mPa·s to 15 mPa·s. None of the inkjet inks used in the field described above, such as commercial/transactional inkjet printing or wide format inkjet printing have a jetting viscosity larger than 15 mPa·s. An increase of jetting ink viscosity could allow to improve the adhesion on several ink receivers such as textiles or glasses, due to a larger choice in raw materials. This formulation latitude of the jettable liquid allows, for example, to include oligomers and/or polymers and/or pigments in a higher amount. This results in a wider accessible receiver range; reduced odour and migration and improved dry speed; environmental, health and safety benefits (EH&S); physical properties benefits; reduced raw material costs and/or reduced ink consumption for higher pigment loads.

In the present invention is the wood pattern preferably rendered in a plurality of passes by inkjet technology because rendering a wood pattern in one pass by inkjet technology suffers in daily production of wood simulated decorative surfaces from operation failures such as failing nozzles in the inkjet print head unit, thereby creating 'empty' line artefacts in the rendered wood pattern and leading to waste of material by a cumbersome removal of these defective decorative laminates after heat pressing. These marking devices contain a serious amount of inkjet print heads in the inkjet print head unit to cover the whole width of the substrate, which makes it a very costly machine.

A printhead may be any type of inkjet head such as a Valvejet printhead, piezoelectric inkjet printhead, thermal inkjet printhead, a continuous inkjet printhead type, electrostatic drop on demand inkjet printhead type or acoustic drop on demand inkjet printhead type or a page-wide inkjet printhead array, also called a page-wide inkjet array.

A printhead comprises a set of master inlets to provide the printhead with a liquid from a set of external liquid feeding units. Preferably, the printhead comprises a set of master outlets to perform a recirculation of the liquid through the printhead. The recirculation may be done before the droplet forming means but it is more preferred that the recirculation is done in the printhead itself, so called through-flow printheads. The continuous flow of the liquid in a through-flow printheads removes air bubbles and agglomerated particles from the liquid channels of the printhead, thereby avoiding blocked nozzles that prevent jetting of the liquid.

The printhead of the present invention is preferably suitable for jetting a liquid having a jetting viscosity of 8 mPa·s to 3000 mPa·s. A preferred printhead is suitable for jetting a liquid having a jetting viscosity of 20 mPa·s to 200 mPa·s; and more preferably suitable for jetting a liquid having a jetting viscosity of 50 mPa·s to 150 mPa·s.

Piezoelectric Inkjet Printheads

A preferred printhead for the present invention is a piezoelectric inkjet printhead. Piezoelectric inkjet printhead, also called piezoelectric inkjet printhead, is based on the movement of a piezoelectric ceramic transducer, comprised in the printhead, when a voltage is applied thereto. The application of a voltage changes the shape of the piezoelectric ceramic transducer to create a void in a liquid channel, which is then filled with liquid. When the voltage is again removed, the ceramic expands to its original shape, ejecting a droplet of liquid from the liquid channel.

The droplet forming means of a piezoelectric inkjet printhead controls a set of piezoelectric ceramic transducers to apply a voltage to change the shape of a piezoelectric ceramic transducer. The droplet forming means may be a squeeze mode actuator, a bend mode actuator, a push mode actuator or a shear mode actuator or another type of piezoelectric actuator.

The piezoelectric inkjet printhead is preferably a through-flow piezoelectric inkjet printhead. In a preferred embodiment the recirculation of the liquid in a through-flow piezoelectric inkjet printhead flows between a set of liquid channels and the inlet of the nozzle wherein the set of liquid channels corresponds to the nozzle.

In a preferred embodiment in a piezoelectric inkjet printhead the minimum drop size of one single jetted droplet is from 0.1 pL to 300 pL, in a more preferred embodiment the minimum drop size is from 1 pL to 30 pL, in a most preferred embodiment the minimum drop size is from 1.5 pL to 15 pL. By using grayscale inkjet head technology multiple single droplets may form larger drop sizes.

In a preferred embodiment the piezoelectric inkjet printhead has a drop velocity from 3 meters per second to 15 meters per second, in a more preferred embodiment the drop velocity is from 5 meters per second to 10 meters per second, in a most preferred embodiment the drop velocity is from 6 meters per second to 8 meters per second.

In a preferred embodiment with the piezoelectric inkjet printhead the jetting viscosity is from 8 mPa·s to 200 mPa·s more preferably from 25 mPa·s to 100 mPa·s and most preferably from 30 mPa·s to 70 mPa·s.

In a preferred embodiment with the piezoelectric inkjet printhead the jetting temperature is from 10° C. to 100° C. more preferably from 20° C. to 60° C. and most preferably from 30° C. to 50° C.

The nozzle spacing distance of the nozzle row in a piezoelectric inkjet printhead is preferably from 10 μm to 200 μm; more preferably from 10 μm to 85 μm; and most preferably from 10 μm to 45 μm.

Movable Inkjet Print Head Unit

In a preferred wood simulation method is the substrate stationary while jetting a pass from the plurality of passes $(P_{1 \ldots L})$ and moves an inkjet print head unit in a scan-movement, preferably in a back-and-forth-movement, while jetting; and wherein the inkjet print head unit comprise a nozzle row for each ink of the M inks $(I_{1 \ldots M})$, wherein the nozzle row is perpendicular oriented to the scan-movement. The substrate may move by discrete distances between the plurality of passes $(P_{1 \ldots L})$ thus between jetting of two succeeding passes. The direction of the discrete distance movements is perpendicular oriented to the scan-movement. The substrate may remain stationary and a beam, whereon a inkjet print head unit moves back-and-forth, moves by discrete distances between the plurality of passes thus between jetting of two succeeding passes. The direction of the discrete distance movements is perpendicular Stationary Inkjet Print Head Unit In a preferred wood simulation method moves the substrate in a print direction and the inkjet print head unit is stationary; and wherein the inkjet print head unit comprises a nozzle row for each ink of the M inks $(I_{1 \ldots M})$, wherein the nozzle row is perpendicular oriented to the print direction.

REFERENCE SIGNS LIST

100 wood pattern
200 knot 205 zone of wood imperfections
300 background color of wood pattern
400 wood nerve
901 L-axis according to CIELAB
902 b-axis according to CIELAB
903 a-axis according to CIELAB
703 x-axis according to CIE 1931 xy chromaticity space
701 y-axis according to CIE 1931 xy chromaticity space

The invention claimed is:

1. A method of manufacturing decorative panels, the method comprising:
    selecting a paper with a paper weight between 50 g/m² and 130 g/m² and a porosity according to Gurley's method (DIN 53120) between 8 and 20 seconds;
    selecting a wood pattern;
    generating a selection mask representing one or more wood nerves, one or more wood pores, and/or one or more wood imperfections from the wood pattern by image-analyzing the wood pattern;
    supplying the wood pattern and the selection mask to an inkjet print head unit to form a decorative layer, the inkjet print head unit including a plurality of nozzles to jet a pigmented aqueous inkjet ink;
    impregnating the decorative layer with a thermosetting resin;
    heat pressing the impregnated decorative layer together with a core layer to form a decorative panel; and
    determining a set of nozzles from the plurality of nozzles based on an inactivity of a nozzle by calculating an inactivity-duration of the nozzles and by comparing the calculated inactivity-duration to a threshold value; wherein
    the decorative layer is formed by:
        jetting droplets of the pigmented aqueous inkjet ink on the paper with the plurality of nozzles to form the wood pattern; and
        jetting droplets of the pigmented aqueous inkjet ink on the paper to prevent clogging of the determined set of nozzles by forming a portion of or an entirety of the selection mask with the determined set of nozzles.

2. The method of manufacturing decorative panels according to claim 1, further comprising:
    applying a set of ink receiving layers before the jetting of droplets; wherein
    a total dry weight of the set of ink receiving layers is between 2.0 g/m² and 10.0 g/m².

3. The method of manufacturing decorative panels according to claim 2, further comprising:
    measuring a humidity at a first time and at a second time at the inkjet print head unit, and enlarging the threshold value when the humidity increases between the first and the second time.

4. The method of manufacturing decorative panels according to claim 3, wherein
    the paper is stationary while the inkjet print head unit moves in a scanning movement direction while jetting the droplets of the pigmented aqueous inkjet ink; and
    the plurality of nozzles are disposed in the inkjet print head unit in a plurality of nozzle rows that are perpendicular to the scanning movement direction.

5. The method of manufacturing decorative panels according to claim 2, wherein each of the ink receiving layers in the set of ink receiving layers includes:
    a water soluble polymeric binder including a hydroxyl group as a hydrophilic structural unit; and
    an inorganic pigment selected from the group consisting of alumina hydrates, aluminum oxides, aluminum hydroxides, aluminum silicates, and silicas.

6. The method of manufacturing decorative panels according to claim 5, wherein a volume of the jetted droplets from the determined set of nozzles is at least a quart smaller than a volume of the jetted droplets that form the wood pattern.

7. The method of manufacturing decorative panels according to claim 6, wherein
    the inkjet print head unit includes a plurality of piezo-electric inkjet printheads; and
    the jetted droplets from the determined set of nozzles are jetted with a first waveform, and the jetted droplets that form the wood pattern are jetted with a second waveform.

8. The method of manufacturing decorative panels according to claim 2, wherein
    the paper is stationary while the inkjet print head unit moves in a scanning movement direction while jetting the droplets of the pigmented aqueous inkjet ink; and
    the plurality of nozzles are disposed in the inkjet print head unit in a plurality of nozzle rows that are perpendicular to the scanning movement direction.

9. The method of manufacturing decorative panels according to claim 2, wherein the impregnating of the decorative layer provides an amount of thermosetting resin equal to 40% to 250% dry weight of resin compared to a weight of the paper.

10. The method of manufacturing decorative panels according to claim 1, wherein a volume of the jetted droplets from the determined set of nozzles is at least a quart smaller than a volume of the jetted droplets that form the wood pattern.

11. The method of manufacturing decorative panels according to claim 10, wherein
    the inkjet print head unit includes a plurality of piezo-electric inkjet printheads; and
    the jetted droplets from the determined set of nozzles are jetted with a first waveform, and the jetted droplets that form the wood pattern are jetted with a second waveform.

12. The method of manufacturing decorative panels according to claim 1, wherein
    the paper is stationary while the inkjet print head unit moves in a scanning movement direction while jetting the droplets of the pigmented aqueous inkjet ink; and
    the plurality of nozzles are disposed in the inkjet print head unit in a plurality of nozzle rows that are perpendicular to the scanning movement direction.

13. The method of manufacturing decorative panels according to claim 1, wherein
    the jetted droplets that form the wood pattern are printed with a single pass inkjet method; and
    the jetted droplets by the determined set of nozzles are printed with a single pass inkjet method or a multi-pass inkjet method.

14. The method of manufacturing decorative panels according to claim 1, wherein the impregnating of the decorative layer provides an amount of thermosetting resin equal to 40% to 250% dry weight of resin compared to a weight of the paper.

15. A deco workflow system adapted to execute the method of claim 1.

* * * * *